United States Patent [19]
Charlier

[11] Patent Number: 5,438,760
[45] Date of Patent: Aug. 8, 1995

[54] CORD SLITTER

[76] Inventor: William L. Charlier, 4074 Perrin Rd., Norwalk, Ohio 44857

[21] Appl. No.: 326,249

[22] Filed: Oct. 20, 1994

[51] Int. Cl.[6] .......................... A47J 17/02; B26B 3/04; B26B 5/00
[52] U.S. Cl. ..................... 30/304; 30/121.5; 30/298; 99/537; 99/623; 460/49
[58] Field of Search ............... 99/485, 537, 538, 623, 99/646 R; 30/124, 302–304, 121.5, 298, 287, 261; 460/38, 48, 49, 53

[56] References Cited
U.S. PATENT DOCUMENTS

| | | | |
|---|---|---|---|
| 3,600,803 | 8/1971 | Nachsi | 30/27 |
| 3,674,035 | 7/1972 | Edmiston | 30/298 |
| 3,735,487 | 5/1973 | Wojcik | 30/124 |
| 4,044,477 | 8/1977 | Moore | 460/51 |
| 4,085,504 | 4/1978 | Nagy | 30/304 |
| 4,885,842 | 12/1989 | Marley | 30/121.5 |
| 4,892,034 | 1/1990 | Miles | 99/537 |
| 5,036,590 | 8/1991 | Reinke et al. | 30/304 |
| 5,036,591 | 8/1991 | Cousins | 30/335 |
| 5,165,319 | 11/1992 | Snyder et al. | 83/840 |
| 5,232,404 | 8/1993 | Felstehausen | 460/48 |

*Primary Examiner*—Timothy F. Simone

[57] ABSTRACT

A corn slitter comprising a central extent formed of a rigid material having a curved surface; a handle extending rearwardly from the rear end of the central component; an upstanding plate at an angle with respect to the central extent, the front end being formed with an angled leading edge; and a plurality of teeth formed in a triangular configuration through the cutting of a V-shaped slit near the leading edge of the central component and bending it in a direction opposite from the direction of bend of the external member.

4 Claims, 4 Drawing Sheets

CORD SLITTER

BACKGROUND OF THE INVENTION

1. Field of the Invention

The present invention relates to a new and improved corn slitter and, more particularly, pertains to cutting and abrading kernels of corn on an ear in order to enhance its taste.

2. Description of the Prior Art

The use of devices for use in association with the culinary arts is known in the prior art. More specifically, food eating mechanisms of various designs and configurations heretofore devised and utilized for the purpose of rendering the eating of food more convenient or tasty are known to consist basically of familiar, expected, and obvious structural configurations, notwithstanding the myriad of designs encompassed by the crowded prior art which has been developed for the fulfillment of countless objectives and requirements.

The prior art discloses a large number of devices for use in association with the culinary arts. By way of example, U.S. Pat. No. 4,044,776 to Moore discloses a corn kernel cutter.

U.S. Pat. No. 4,085,504 to Nagy discloses a multi-bladed knife.

U.S. Pat. No. 5,036,591 to Cousins discloses a utility knife.

U.S. Pat. No. 5,165,319 to Snyder discloses a cutting knife with multiple insert blades.

Lastly, U.S. Pat. No. 5,232,404 to Felstehausen discloses a cob cutter blade and method of manufacture.

In this respect, the corn slitter according to the present invention substantially departs from the conventional concepts and designs of the prior art, and in doing so provides an apparatus primarily developed for the purpose of cutting and abrading kernels of corn on an ear prior to being eaten.

Therefore, it can be appreciated that there exists a continuing need for a new and improved corn slitter which can be used for cutting and abrading kernels of corn on an ear prior to being eaten. In this regard, the present invention substantially fulfills this need.

SUMMARY OF THE INVENTION

In view of the foregoing disadvantages inherent in the known types of food eating mechanisms of various designs and configurations now present in the prior art, the present invention provides a new and improved corn slitter. As such, the general purpose of the present invention, which will be described subsequently in greater detail, is to provide a new and improved corn slitter and methods which have all the advantages of the prior art and none of the disadvantages.

To attain this, the present invention essentially comprises a new and improved corn slitter comprising, in combination, a central extent formed of a rigid material having a surface curved about a longitudinal axis with a forward end and a rearward end; a handle with a forward end and a rearward end, the handle extending rearwardly from the rear end of the central extent; an upstanding plate with a forward end and a rearward end, the plate extending forwardly from the forward end of the central extent at an angle of between about 120 degrees and 150 degrees with respect to the axis of the central extent to provide rigidity to the system; and a plurality of teeth located at the forward end of the central extent, each tooth being formed in a triangular configuration through the cutting of a V-shaped slit to form a triangular projection and binding such projection in a direction opposite from the direction of bend of the external plate whereby pulling the central extent over an ear of corn will abrade the kernels to enhance the taste thereof.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved corn slitter which has all the advantages of the prior art food eating mechanisms of various designs and configurations and none of the disadvantages.

It is another object of the present invention to provide a new and improved corn slitter which may be easily and efficiently manufactured and marketed.

It is a further object of the present invention to provide a new and improved corn slitter which is of a durable and reliable construction.

An even further object of the present invention is to provide a new and improved corn slitter which is susceptible of a low cost of manufacture with regard to both materials and labor, and which accordingly is then susceptible of low prices of sale to the consuming public, thereby making such a corn slitter economically available to the buying public.

Still yet another object of the present invention is to provide a new and improved corn slitter which provides in the apparatuses and methods of the prior art some of the advantages thereof, while simultaneously overcoming some of the disadvantages normally associated therewith.

Even still another object of the present invention is to cut and abrade kernels of corn on an ear prior to being eaten.

Lastly, it is an object of the present invention to provide a corn slitter comprising a central extent formed of a rigid material having a curved surface; a handle extending rearwardly from the rear end of the central component; an upstanding plate at an angle with respect to the central extent, the front end being formed with an angled leading edge; and a plurality of teeth formed in a triangular configuration through the cutting of a V-shaped slit near the leading edge of the central component and bending it in a direction opposite from the direction of bend of the external member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
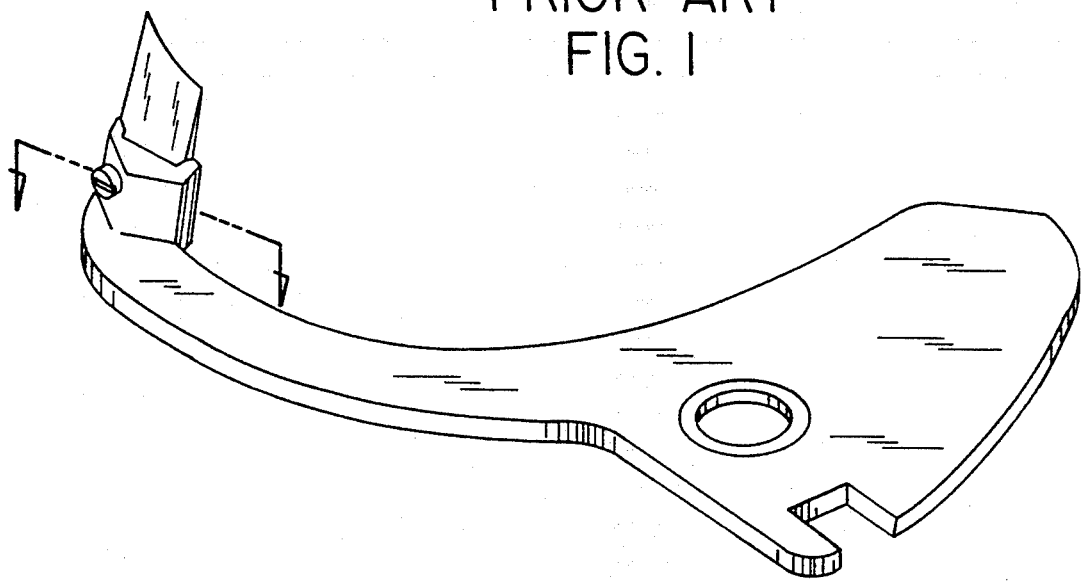
FIG. 1 is a perspective illustration of a prior art device for use in association with eating corn.
Figure 2:
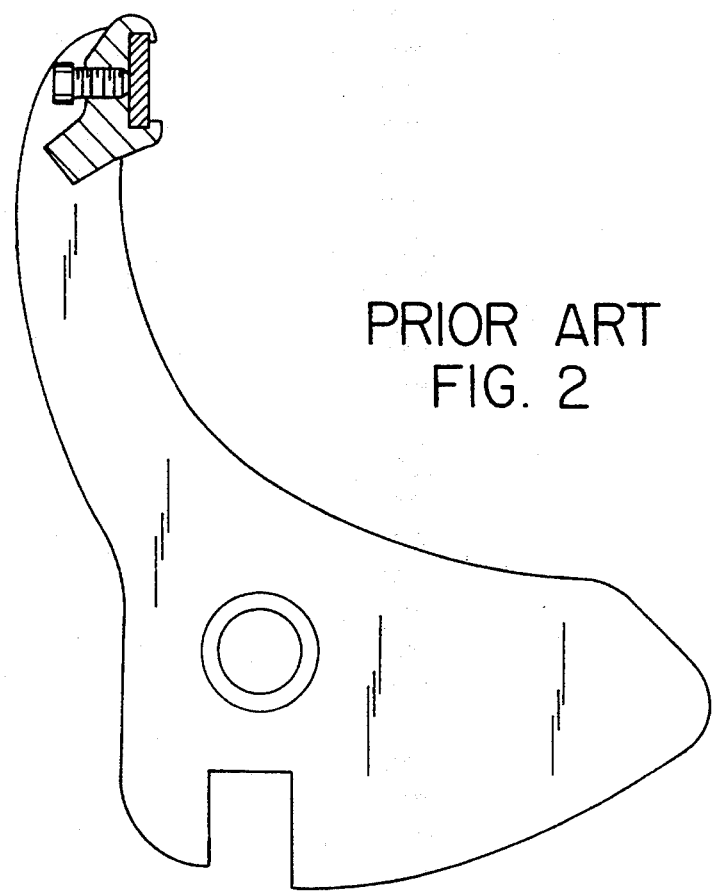
FIG. 2 is a top elevational view of the device shown in FIG. 1 with a portion shown in cross-sectional configuration.
Figure 3:
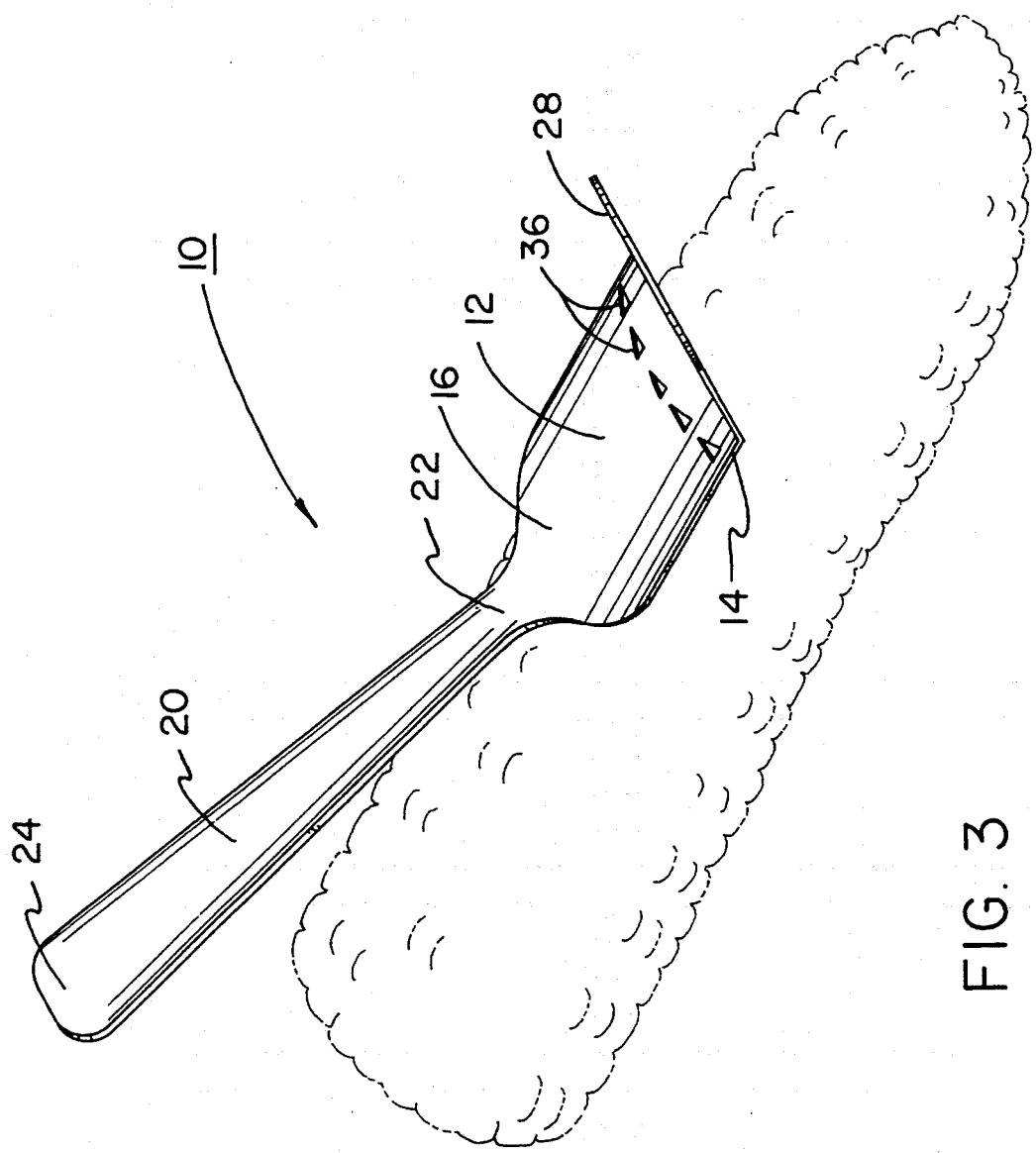
FIG. 3 is a perspective illustration of the preferred embodiment of the new and improved corn slitter constructed in accordance with the principles of the present invention.
Figures 4, 5:
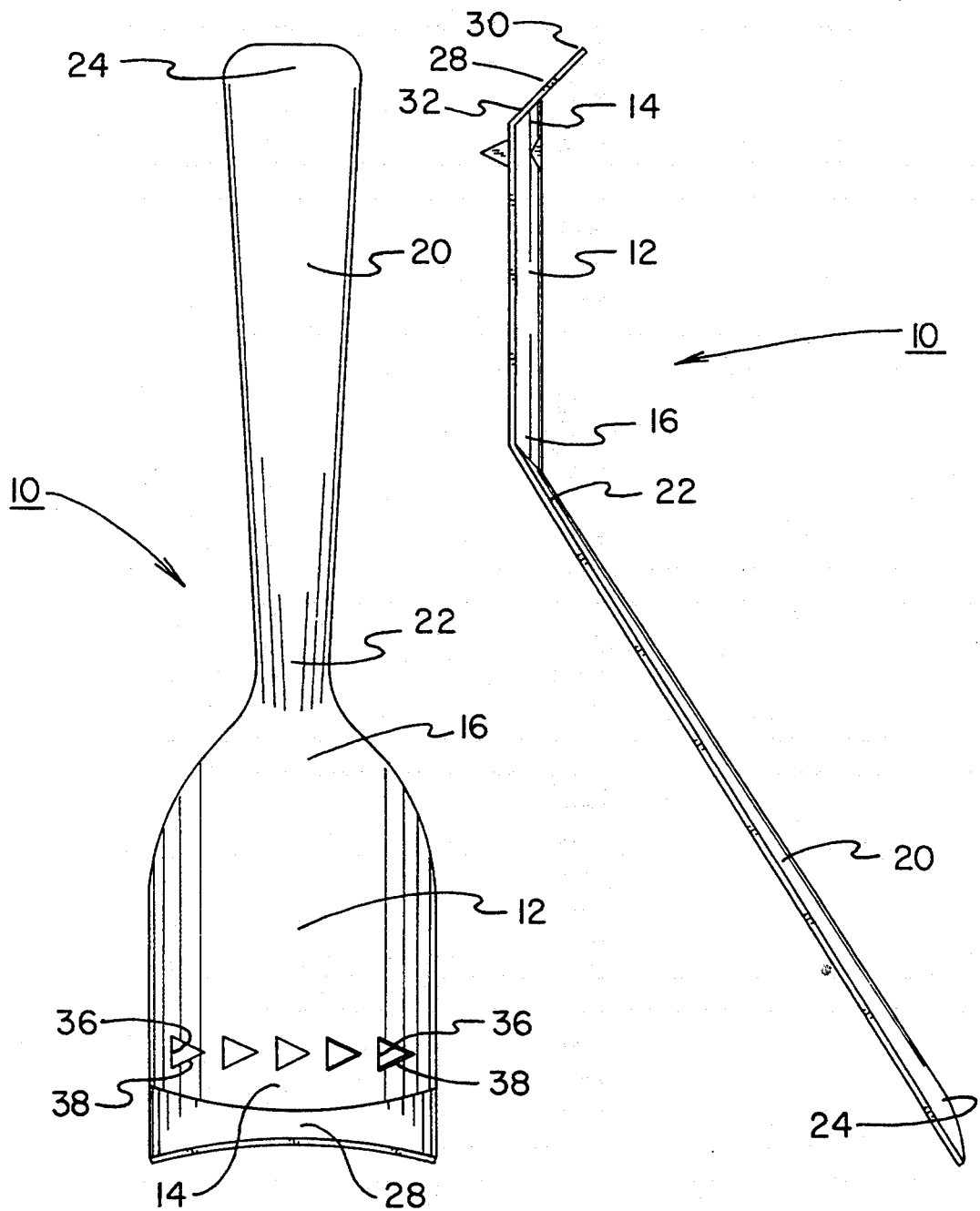
FIG. 4 is a top elevational view of the device shown in FIG. 3.
FIG. 5 is a side elevational view of the device shown in FIGS. 3 and 4.
Figure 6:
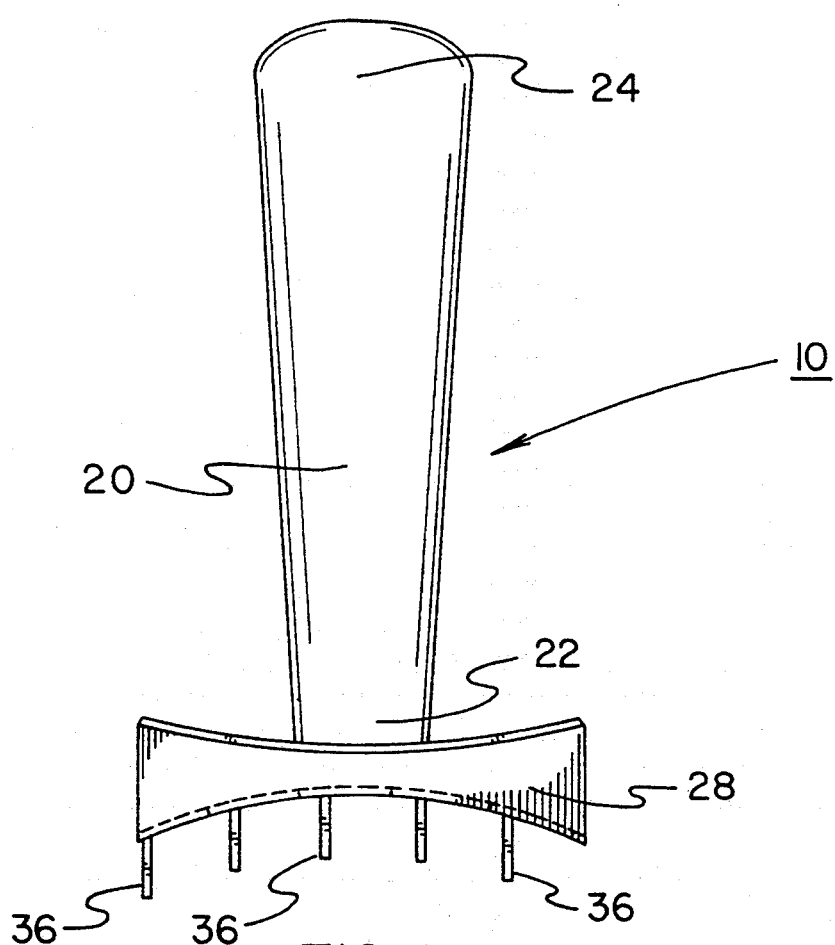
FIG. 6 is a bottom elevational view of the device shown in FIGS. 3 through 5.
Figure 7:
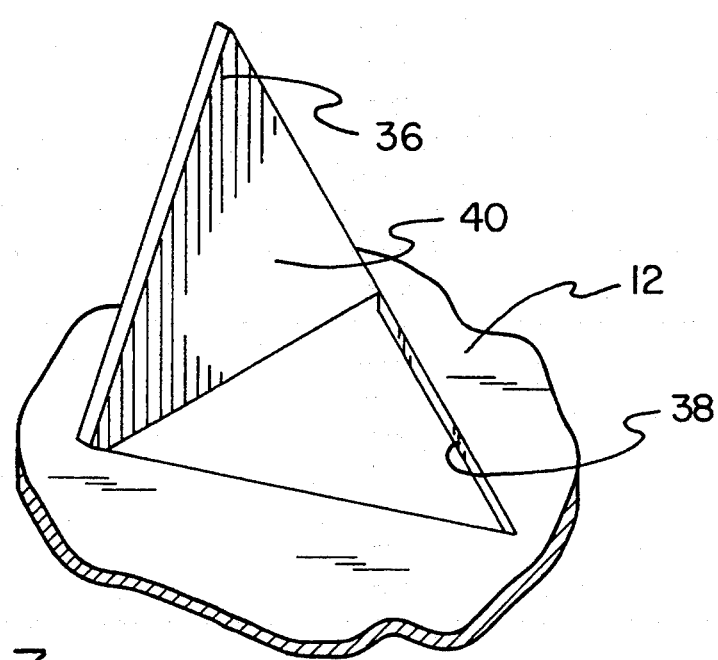
FIG. 7 is an enlarged perspective view of one of the cutting elements shown in FIGS. 3 through 6.

With reference now to the drawings, and in particular to FIGS. 3 through 7 thereof, the preferred embodiment of the new and improved corn slitter embodying the principles and concepts of the present invention and generally designated by the reference numeral 10 will be described.

The present invention, the new and improved corn slitter, is a device 10 comprised of a plurality of components. Such components, in their broadest context, include a central extent, a handle, an upstanding plate and a plurality of teeth. Each of the individual components is specifically configured and correlated one with respect to the other so as to attain the desired objectives.

The present invention is a system 10 which has as its central component a central extent 12. Such central extent is formed of a rigid material. It has a surface curved about a longitudinal axis with a forward end 14 and a rearward end 16.

The next component of the system 10 is the handle 20. Such handle has a forward end 22 and a rearward end 24. The handle extends rearwardly from the rear end of the central extent. It is for being grasped to move the central extent during operation and use.

Next provided is an upstanding plate 28. Such plate is formed with a forward end 30 and a rearward end 32. The plate extends forwardly from the forward end of the central extent. The plate extends at an angle of between about 120 degrees and 150 degrees with respect to the axis of the central extent. The preferred angle is about 135 degrees. The function of the upstanding plate is to provide rigidity to the system, particularly to the central extent which is curved.

Next provided are a plurality of teeth 36. Such teeth are located at the forward end of the central extent. Each tooth is formed in a triangular configuration through the cutting of a V-shaped slit 38. Such cutting acts to form triangular projections 40. Such projections are bent in a direction opposite from the direction of bend of the external plate. In this manner, pulling the central extent over an ear of corn will abrade the kernels to enhance the taste thereof.

In the preferred embodiment, five such projections are provided in a linear array near the leading edge of the central extent. The line coupling the projections to the central extent are parallel with the axis of the central extent.

The present invention is similar to one that was on the market many years ago. Its purpose is to score or slit kernels of corn on the cob. The rationale for this procedure is as follows: The juicy, tender, tasteful part of each corn kernel is encased inside a tough, hard-to-digest outer skin. Many people would prefer to consume the inner part without eating the tough outer skin. The present invention allows them to do this.

The product consists of a small stainless steel handheld implement with a row of small triangular metal teeth positioned across the width of the tool. The teeth are arranged facing sideways to provide a narrow slit instead of a wide gash in the kernels. In addition, the row of teeth is slightly concave in order to mold to the curved surface of an ear of corn.

The tool is used as follows: Holding it in one hand and an ear of corn in the other, you draw the tool lengthwise along the ear, pressing firmly enough so that the teeth split the kernels as you do so. Repeat this procedure as many times as necessary to score the entire ear of corn. Your corn is then ready to eat. For anyone who dislikes eating the outside portion of the corn, the present invention is an ideal product.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved corn slitter comprising, in combination:
    a central extent formed of a rigid material having a surface curved about a longitudinal axis with a forward end and a rearward end;
    a handle with a forward end and a rearward end, the handle extending rearwardly from the rearward end of the central extent;
    an upstanding plate with a forward end and a rearward end, the plate extending forwardly from the forward end of the central extent at an angle of between about 120 degrees and 150 degrees with respect to the axis of the central extent to provide rigidity to the system; and
    a plurality of teeth located at the forward end of the central extent, each tooth being formed in a triangular configuration through the cutting of a V-shaped slit to form a triangular projection and bending such projection in a direction opposite from the direction of bend of the external plate whereby pulling the central extent over an ear of corn will abrade the kernels to enhance the taste thereof.

2. A corn slitter comprising:
    a central extent formed of a rigid material having a curved surface;
    a handle extending rearwardly from the rear end of the central extent;
    an upstanding plate at an angle with respect to the central extent, the front end being formed with an angled leading edge; and
    a plurality of teeth formed in a triangular configuration through the cutting of a V-shaped slit near the leading edge of the central extent and bending it in a direction opposite from the direction of bend of the external member.

3. The apparatus as set forth in claim 2 wherein the upstanding plate is at an angle of about 145 degrees.

4. The apparatus as set forth in claim 3 wherein the projections are attached to the central extent along lines parallel with the axis of the central extent.

* * * * *